US012273757B2

(12) United States Patent
Choe et al.

(10) Patent No.: US 12,273,757 B2
(45) Date of Patent: Apr. 8, 2025

(54) METHOD AND APPARATUS FOR HANDLING FAILURES IN TRANSMISSION USING PUR IN A WIRELESS COMMUNICATION SYSTEM

(71) Applicant: LG ELECTRONICS INC., Seoul (KR)

(72) Inventors: Hyunjung Choe, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/769,555

(22) PCT Filed: Nov. 13, 2020

(86) PCT No.: PCT/KR2020/015990
§ 371 (c)(1),
(2) Date: Apr. 15, 2022

(87) PCT Pub. No.: WO2021/096287
PCT Pub. Date: May 20, 2021

(65) Prior Publication Data
US 2024/0137793 A1  Apr. 25, 2024
US 2024/0236734 A9  Jul. 11, 2024

(30) Foreign Application Priority Data

Nov. 15, 2019  (KR) .................. 10-2019-0146577

(51) Int. Cl.
*H04W 28/00*  (2009.01)
*H04L 1/1829*  (2023.01)
(Continued)

(52) U.S. Cl.
CPC ........... *H04W 24/10* (2013.01); *H04L 1/1854* (2013.01); *H04L 41/0631* (2013.01)

(58) Field of Classification Search
CPC ..... H04W 24/10; H04W 76/19; H04W 72/23; H04W 4/40; H04W 24/08;
(Continued)

(56) References Cited

U.S. PATENT DOCUMENTS 10,952,260 B1 *  3/2021  Selvaganapathy .......................... H04W 74/0866
10,999,885 B1 *  5/2021  Shih ....................... H04W 76/19
(Continued)

FOREIGN PATENT DOCUMENTS

| WO | 2020032756 | 2/2020 |
| WO | 2020092126 | 5/2020 |
| WO | 2020167657 | 8/2020 |

OTHER PUBLICATIONS

Huawei et al., UL transmission in preconfigured resource, R1-1910081, 3GPP TSG RAN WG1 Meeting #98bis, Chongqing, China, Oct. 5, 2019, sections 2.2.1, 2.2.2.
(Continued)

*Primary Examiner* — Hanh N Nguyen
(74) *Attorney, Agent, or Firm* — BRYAN CAVE LEIGHTON PAISNER LLP

(57) ABSTRACT

A method and apparatus for handling failures in transmission using PUR in a wireless communication system is provided. A wireless device receives, from a network, preconfigured uplink resource (PUR) configuration. A wireless device detects that each resource of the PUR is not successfully used for uplink (UL) transmission. A wireless device informs the failure cause and/or the expected behavior based on the PUR configuration. A wireless device receives, from a network, reconfiguration of the PUR.

16 Claims, 17 Drawing Sheets

(51) Int. Cl.
*H04L 41/0631* (2022.01)
*H04W 24/10* (2009.01)

(58) Field of Classification Search
CPC ............ H04W 72/1268; H04L 1/1854; H04L 41/0631; H04L 1/188
See application file for complete search history.

(56) References Cited

U.S. PATENT DOCUMENTS

| | | |
|---|---|---|
| 11,930,491 B2 * | 3/2024 | Hu .................. H04W 76/27 |
| 2018/0160418 A1 | 6/2018 | Luo et al. |
| 2021/0014864 A1 * | 1/2021 | Phuyal ............... H04W 72/23 |
| 2022/0045736 A1 * | 2/2022 | Hu .................. H04J 11/0076 |
| 2022/0167452 A1 * | 5/2022 | Chang ............... H04W 74/0833 |
| 2023/0171765 A1 * | 6/2023 | Hong ................ H04W 76/30 |
| | | 370/329 |

OTHER PUBLICATIONS

Lenovo, et al., UL transmission in preconfigured resources for MTC, R1-1910149, 3GPP TSG RAN WG1 Meeting #98bis, Chongqing, China, Oct. 4, 2019, sections 2.1.4, 2.1.6.

Ericsson, PUR Data Transmission—Remaining open issues, R2-1913121, 3GPP TSG RAN WG2 #107bis, Chongqing, China, Oct. 4, 2019, section 2.1.

Qualcomm Incorporated, Summary of offline #706, FFSes on PUR, R2-1914098, 3GPP TSG RAN WG2 #107bis, Chongqing, China, Oct. 18, 2019, section 2.4.1.

* cited by examiner

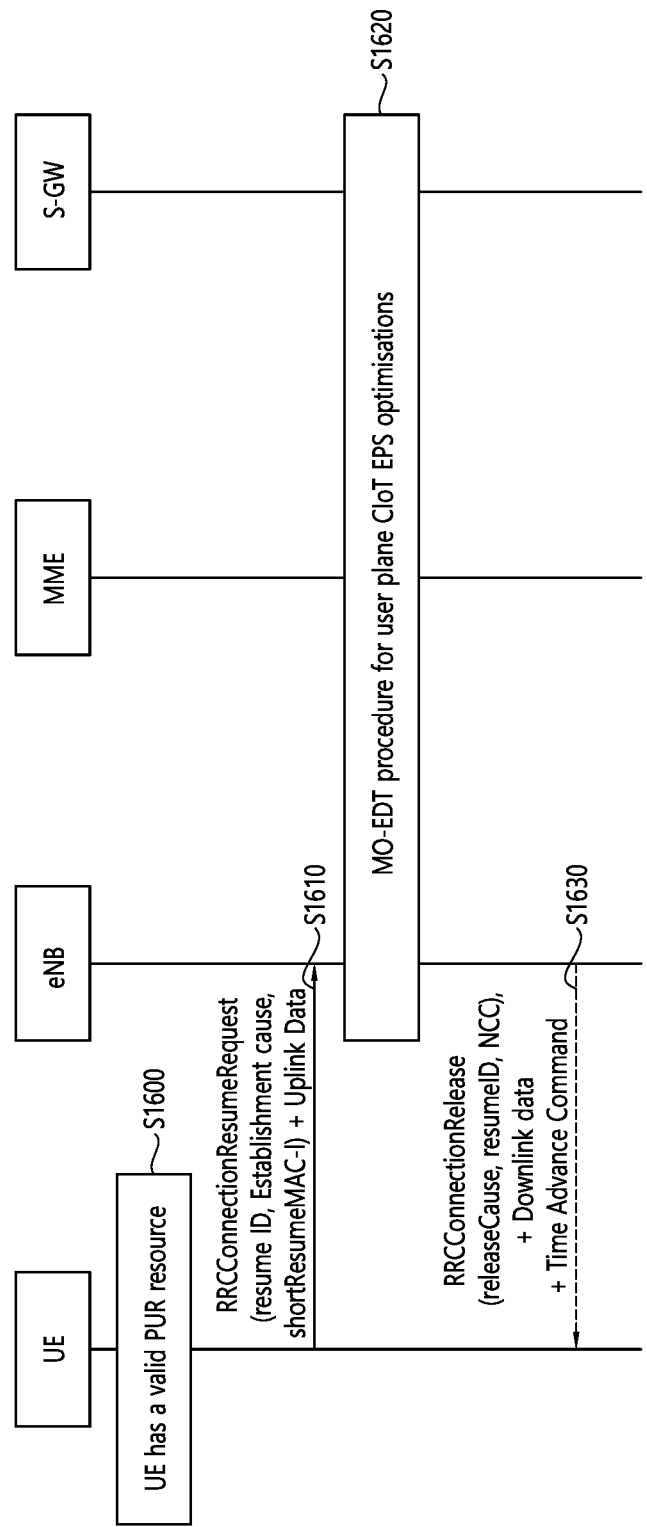

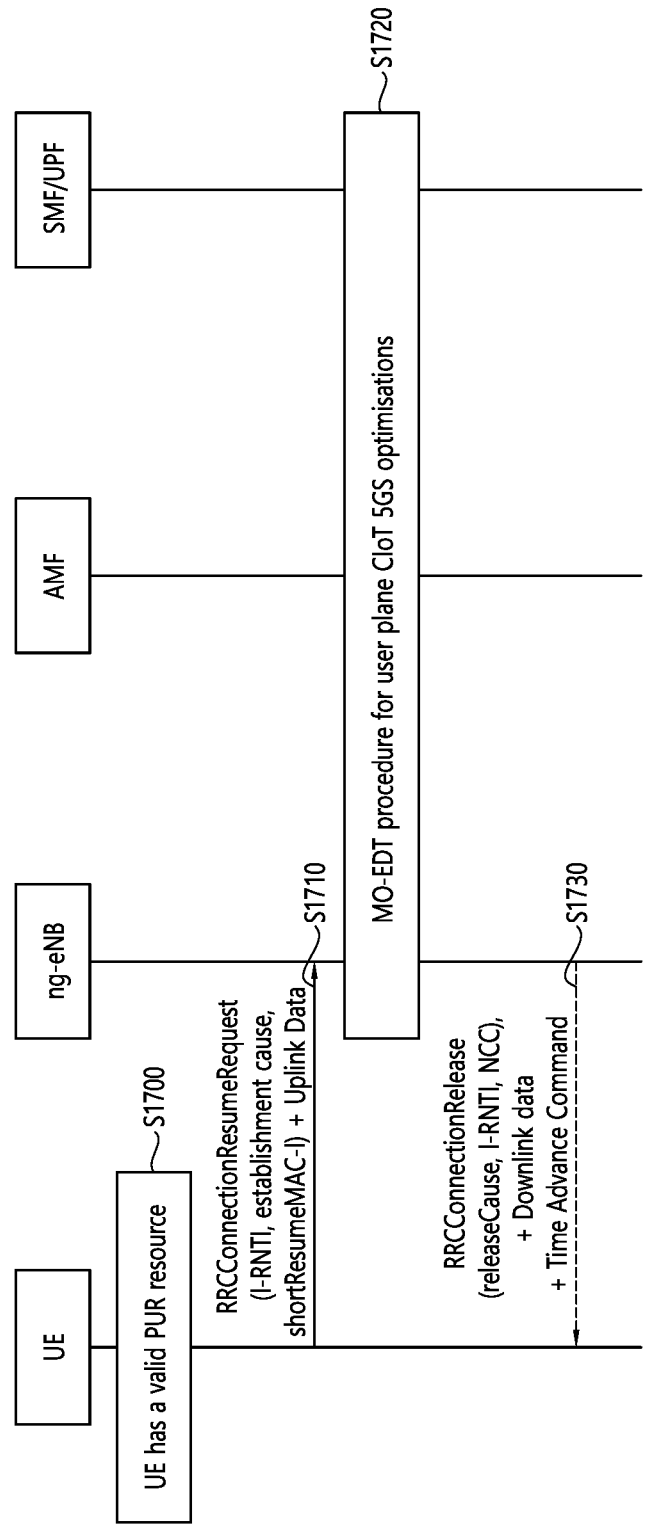

METHOD AND APPARATUS FOR HANDLING FAILURES IN TRANSMISSION USING PUR IN A WIRELESS COMMUNICATION SYSTEM

This application is the National Stage filing under 35 U.S.C. 371 of International Application No. PCT/KR2020/015990 filed on Nov. 13, 2020, which claims priority to Korean Patent Application No. 10-2019-0146577 filed on Nov. 15, 2019, the contents of which are all hereby incorporated by reference herein in their entirety.

BACKGROUND

Technical Field

The present disclosure relates to a method and apparatus for handling failures in transmission using PUR in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In Rel-13, narrowband internet-of-things (NB-IoT) and LTE for machine-type communication (LTE-M) were standardized to provide wide-area connectivity for IoT. The technologies in Rel-14 evolved beyond the basic functionality specified in Rel-13. In Rel-15, to optimize the support for infrequent small data packet transmissions.

For internet-of-things (IOT) user equipment (UE) such as MTC UE and NB-IOT, there are high requirements on the life of battery. Power consumption of wireless device is a key improvement indicator. In the long term evolution (LTE) R-16, one technical requirement is to support uplink transmission in RRC idle mode so that the wireless device could save the power used to enter RRC connected mode.

SUMMARY

Technical Objects

Preconfigured uplink resource (PUR) is designed for NB-IoT and MTC networks in order to save power consumption for data transmission. The UE may transmit UL data in RRC_IDLE and/or RRC_INACTIVE without random access procedure and/or state transition to a connected state (for example, RRC_CONNECTED).

When a UE detects consecutive PUR transmission failures, the UE may request PUR configuration release to the network. However, it could waste the resource to release the PUR configuration for all of the PUR transmission failures.

Therefore, studies for handling failures in transmission using PUR in a wireless communication system are required.

Technical Solutions

In an aspect, a method performed by a wireless device in a wireless communication system is provided. A wireless device receives, from a network, preconfigured uplink resource (PUR) configuration. A wireless device detects that each resource of the PUR is not successfully used for uplink (UL) transmission. A wireless device informs the failure cause and/or the expected behavior based on the PUR configuration. A wireless device receives, from a network, reconfiguration of the PUR.

In another aspect, an apparatus for implementing the above method is provided.

Technical Effects

The present disclosure can have various advantageous effects.

According to some embodiments of the present disclosure, a wireless device could handle failures in transmission using PUR efficiently.

For example, a wireless device may not release preconfigured resource by reporting at least one of the failure cause, the failure reason, and/or the expected behavior.

For example, a wireless device could avoid the signalling by receiving resource reconfiguration rather than receiving resource configuration after release.

For example, a wireless device could save the resource by receiving resource reconfiguration without releasing the PUR.

According to some embodiments of the present disclosure, a wireless communication system could handle failures in transmission using PUR efficiently.

For example, a wireless communication system could save resources by providing resource reconfiguration to a wireless device without releasing the PUR.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF THE DRAWINGS

FIG. 16 shows an example of transmission using PUR for the user plane CIoT EPS optimization to which implementations of the present disclosure is applied.

FIG. 17 shows an example of transmission using PUR for the user plane CIoT 5GS optimization to which implementations of the present disclosure is applied.

DETAILED DESCRIPTION

Figure 1:
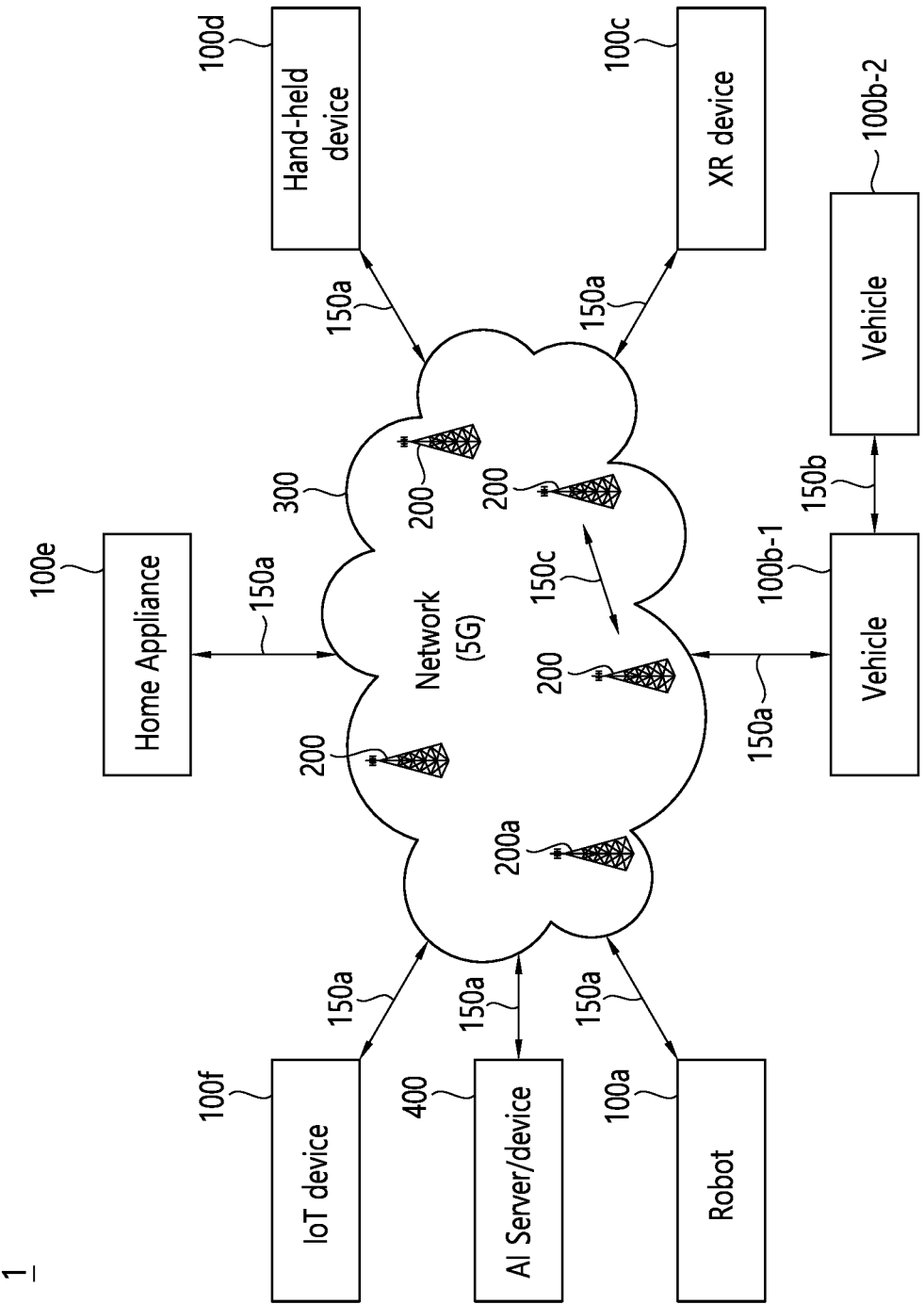
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified.

Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smart-pad, a wearable device (e.g., a smartwatch or a smart-glasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
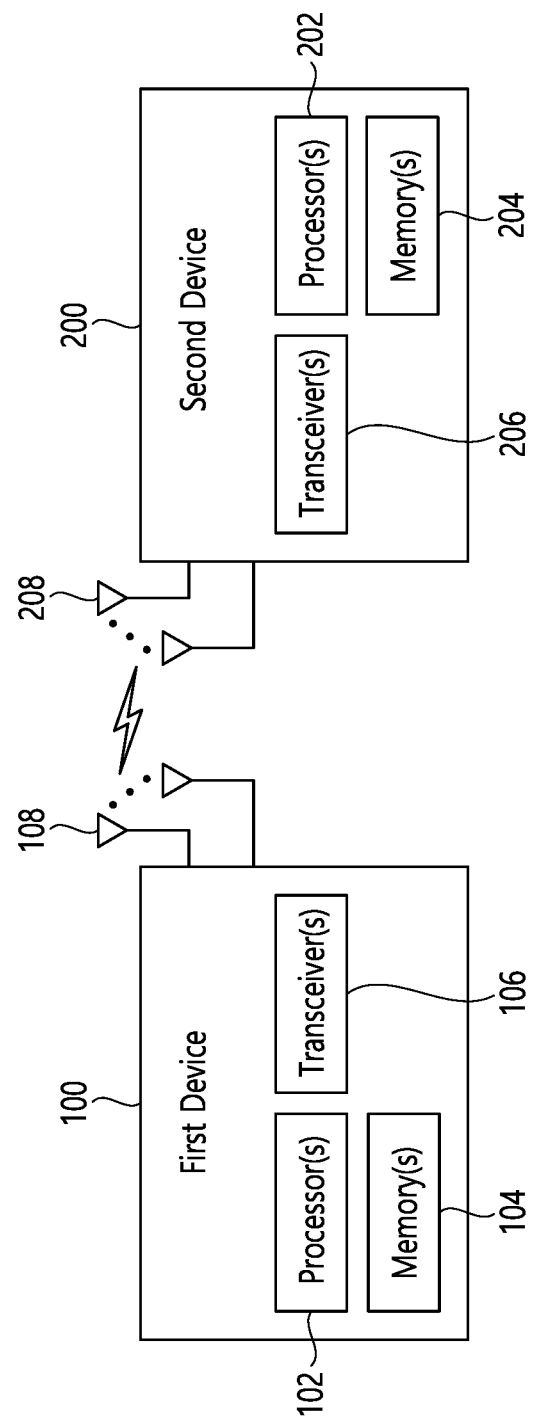
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. Descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
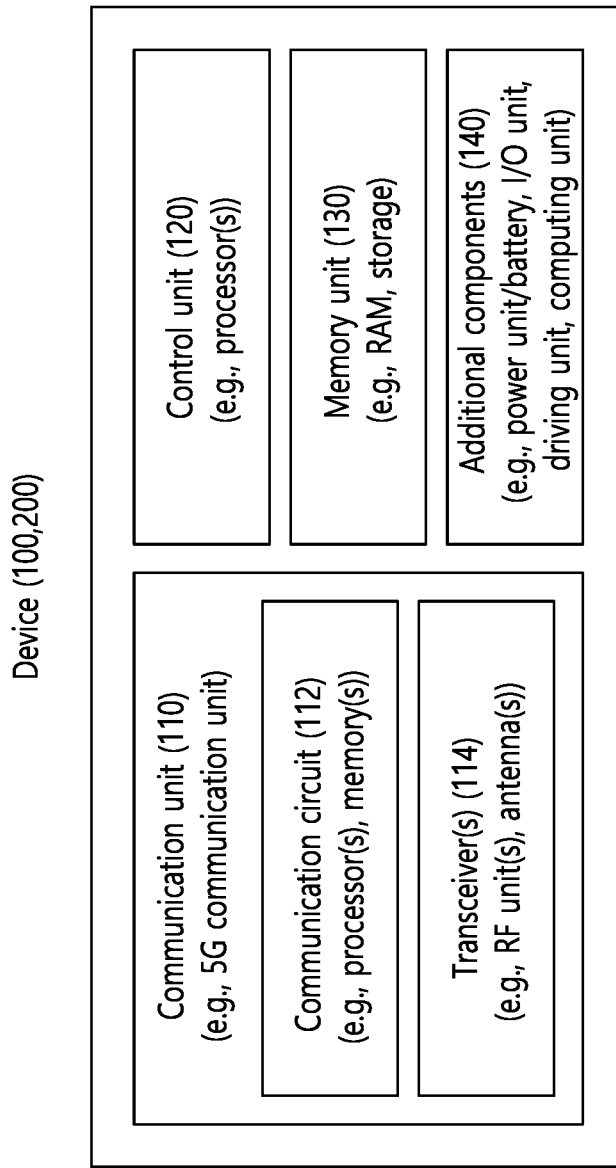
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
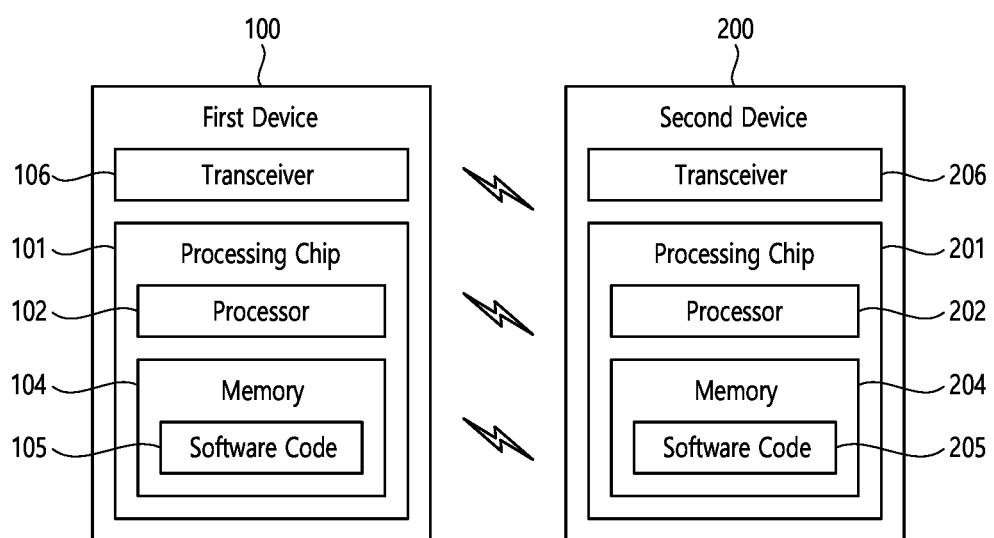
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
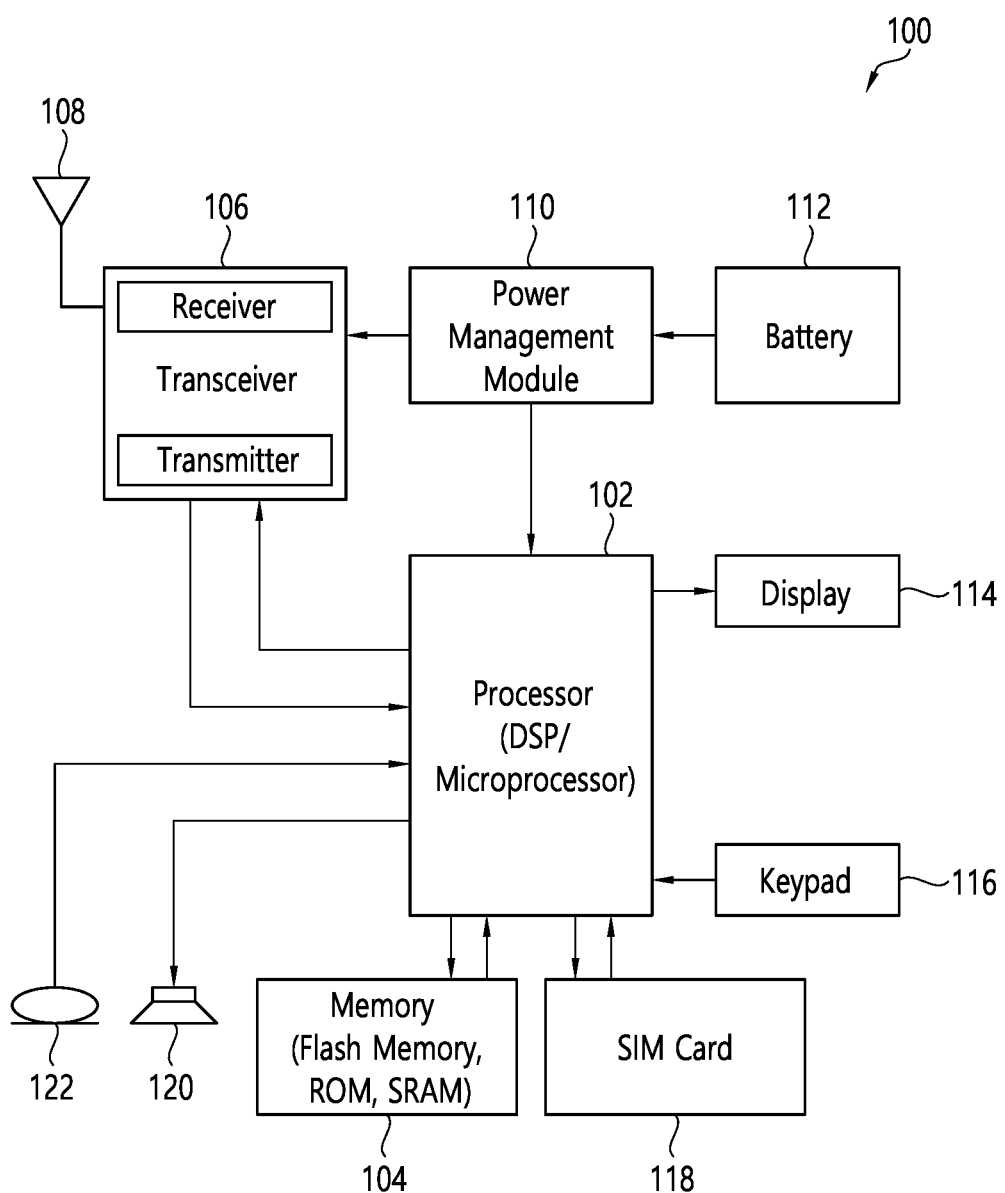
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
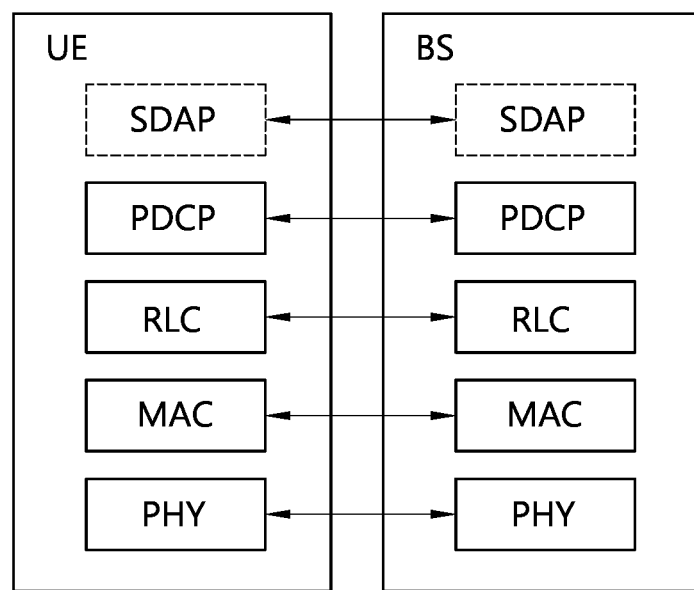
FIGS. 6 and 7 show an example of protocol stacks in a 3GPP based wireless communication system to which implementations of the present disclosure is applied.
Figure 7:
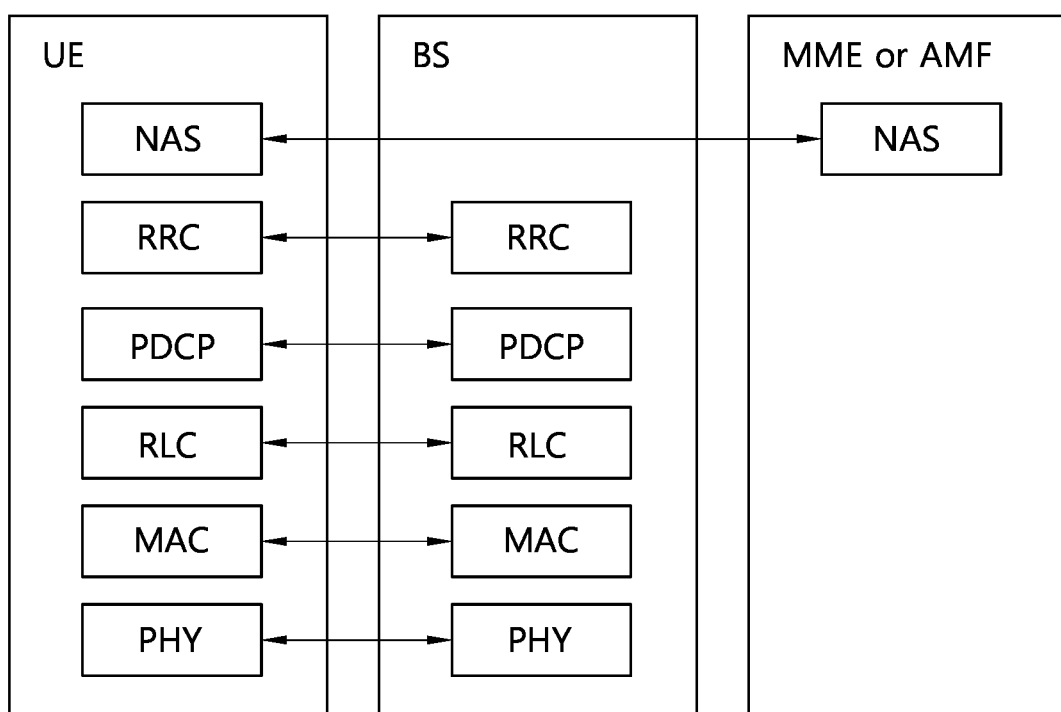

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
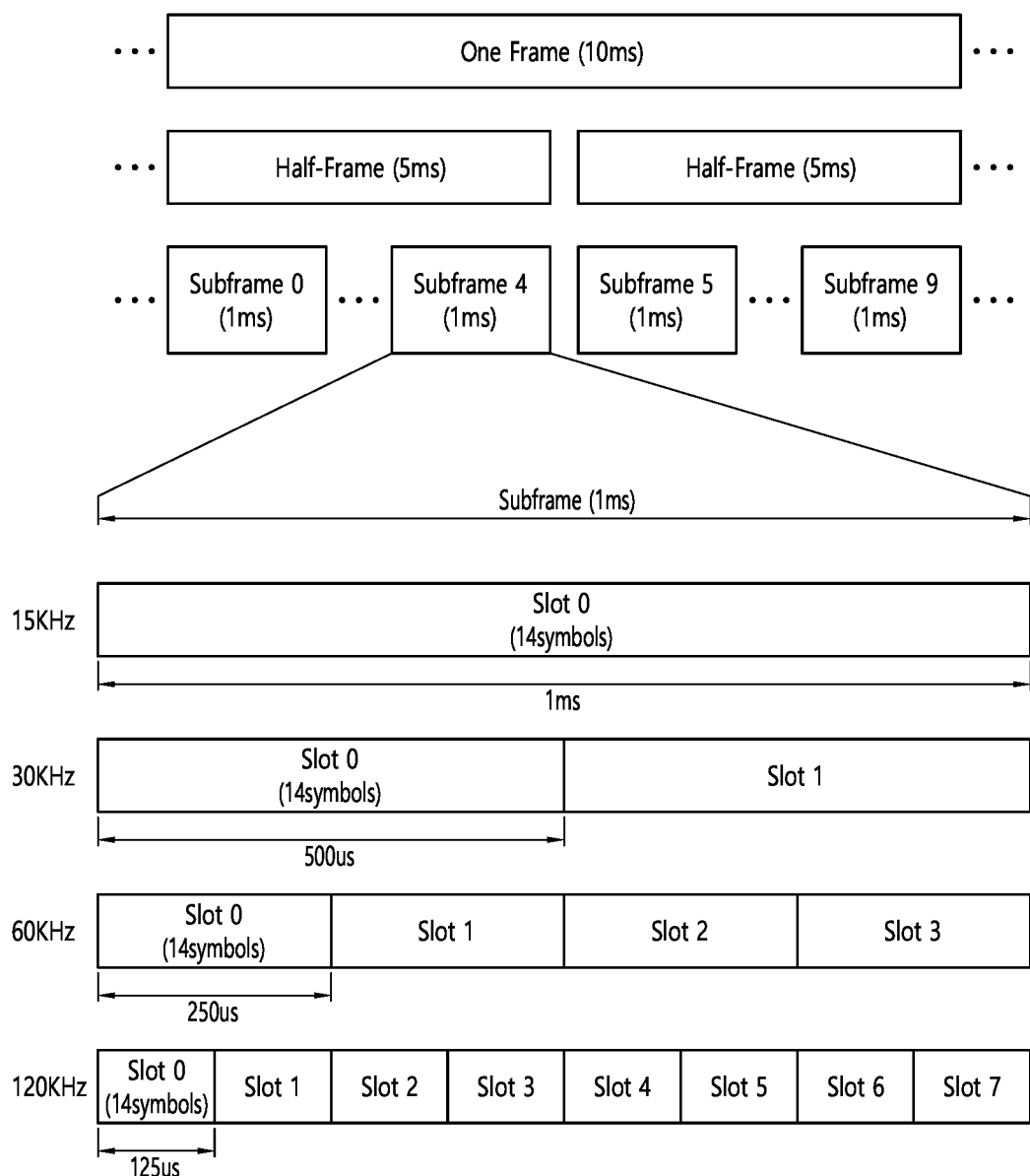
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has Tf=10 ms duration. Each frame is divided into two half-frames, where each of the half-frames has 5 ms duration. Each half-frame consists of 5 subframes, where the duration Tsf per subframe is 1ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2u*15$ kHz.

Table 1 shows the number of OFDM symbols per slot Nslotsymb, the number of slots per frame Nframe,uslot, and the number of slots per subframe Nsubframe,uslot for the normal CP, according to the subcarrier spacing $\Delta f = 2u*15$ kHz.

TABLE 1

| u | Nslotsymb | Nframe, uslot | Nsubframe, uslot |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot Nslotsymb, the number of slots per frame Nframe,uslot, and the number of slots per subframe Nsubframe,uslot for the extended CP, according to the subcarrier spacing $\Delta f = 2u*15$ kHz.

TABLE 2

| u | Nslotsymb | Nframe, uslot | Nsubframe, uslot |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of Nsize,ugrid, x*NRBsc subcarriers and Nsubframe,usymb OFDM symbols is defined, starting at common resource block (CRB) Nstart,ugrid indicated by higher-layer signaling (e.g., RRC signaling), where Nsize,ugrid,x is the number of resource blocks (RBs) in the resource grid and the subscript x is DL for downlink and UL for uplink. NRBsc is the number of subcarriers per RB. In the 3GPP based wireless communication system, NRBsc is 12 generally. There is one resource grid for a given antenna port p, subcarrier spacing configuration u, and transmission direction (DL or UL). The carrier bandwidth Nsize,ugrid for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to NsizeBWP,i−1, where i is the number of the bandwidth part. The relation between the physical resource block nPRB in the bandwidth part i and the common resource block nCRB is as follows: nPRB=nCRB+NsizeBWP,i, where NsizeBWP,i is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

Figure 9:
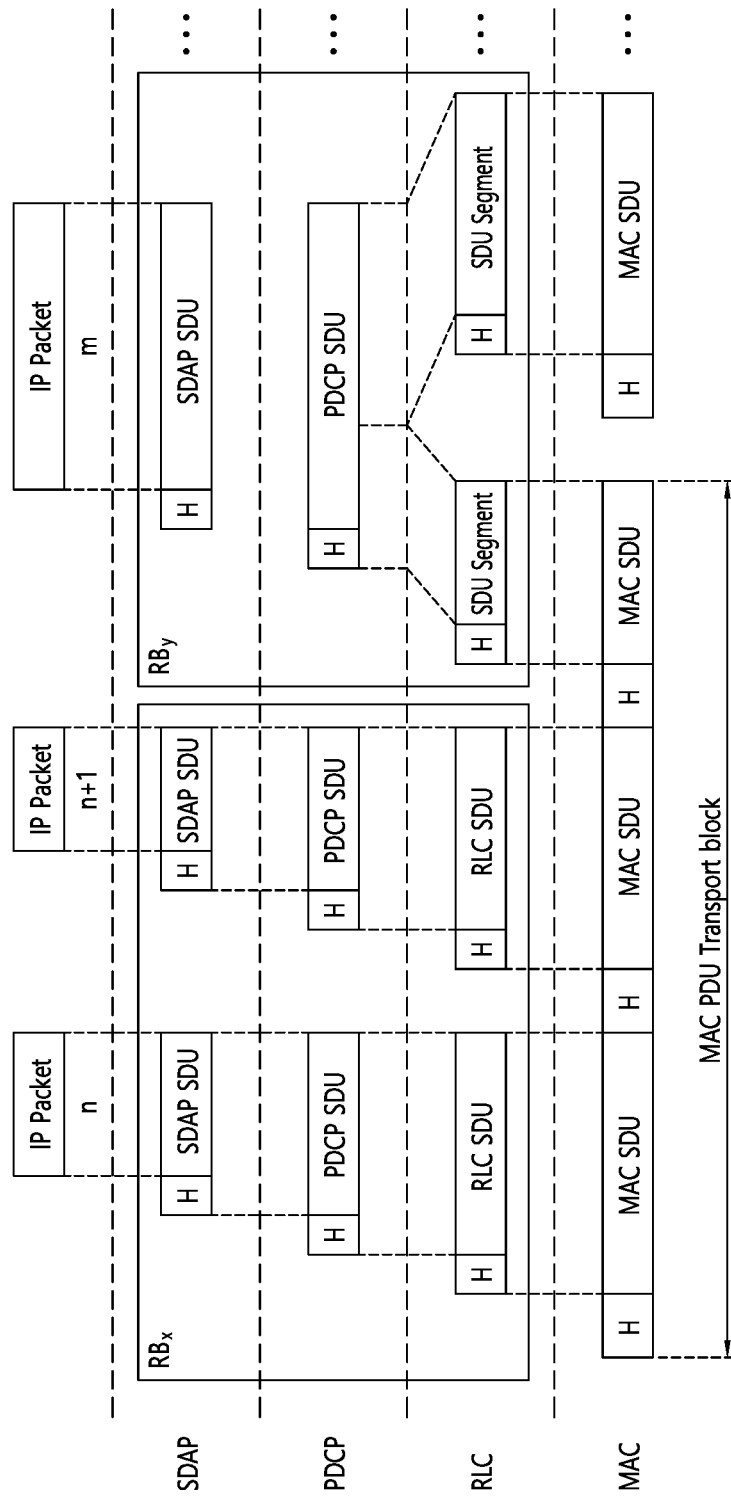
FIG. 9 shows a data flow example in the 3GPP NR system to which implementations of the present disclosure is applied.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG. FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e., E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

Preconfigured uplink resource (PUR) is designed for NB-IoT and MTC networks in order to save power consumption for data transmission. The network may configure PUR for predictable traffic patterns to a UE in an idle state (e.g., RRC_IDLE) and/or an inactive state (e.g., RRC_INACTIVE). The UE may transmit UL data in RRC_IDLE and/or RRC_INACTIVE without random access procedure and/or state transition to a connected state (e.g., RRC_CONNECTED).

Regarding transmission using PUR, the followings have been agreed.

Transmission in dedicated PUR in RRC_IDLE is supported for UEs with a valid timing advance.

The eNB can (re)configure and release dedicated PUR by dedicated RRC signaling.

Periodic dedicated PUR with duration is supported.

Multi-shot dedicated PUR is supported with the possibility to configure as a single shot.

UE may perform a dedicated PUR request/information, if dedicated PUR is indicated as enabled in the cell.

Network makes the decision on the dedicated PUR configuration.

Request/information can include: Requested transport block size (TBS) and Requested periodicity Dedicated PUR configuration may be released when the eNB doesn't detect "m" consecutive UE transmissions.

The UE must release the dedicated PUR when it does a random access procedure on a new cell.

Dedicated PUR configuration can be set up without a pre-defined end (infinite).

It is possible to configure TBS for dedicated PUR for both NB-IoT and eMTC up to the maximum supported based on the UE category and TBS capability.

For user plane, the UE may transmit dedicated PUR release request/(re)configuration request when transmitting using dedicated PUR.

RRC response message needs to be supported by the UE and could be used in all cases.

For some cases, L1 signaling is sufficient to acknowledge, i.e., RRC response message is not needed.

The L1 signaling for acknowledgement may be sent only after the eNB determines there is no pending DL data or signaling.

The configuration for dedicated PUR provided by RRC signaling may not be updated via L1 signaling.

It is feasible to provide the UE with a UE-specific radio network temporary identifier (RNTI) for dedicated PUR. Common or shared RNTI is also feasible.

The RNTI used for D-PUR is signaled together with other dedicated PUR configuration.

As described below, the current PUR design may always require to monitor PDCCH. When DL information is to be delivered on PDSCH, the UE may first monitor PDCCH to acquire PDSCH scheduling information. Then, the UE may receive the DL information via PDSCH scheduled by the PDCCH.

Figure 10:
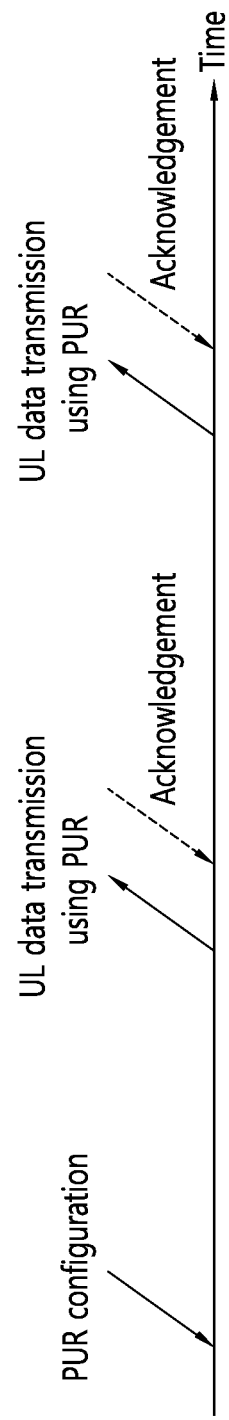
FIG. 10 shows an example of a general procedure for transmission using PUR.

FIG. 10 shows an example of a general procedure for transmission using PUR.

(1) The network configures PUR to the UE.
(2) The UE transmits UL data using PUR in RRC_IDLE and/or RRC_INACTIVE.
(3) The UE receives an acknowledgement for UL data transmission using PUR.

In order to receive the acknowledgement for UL data transmission using PUR, the UE would monitor PDCCH. Then, if further information such as timing advance command (TAC) MAC control element (CE) is to be delivered on PDSCH, the UE may monitor PDSCH using the scheduling information in PDCCH.

Figure 11:
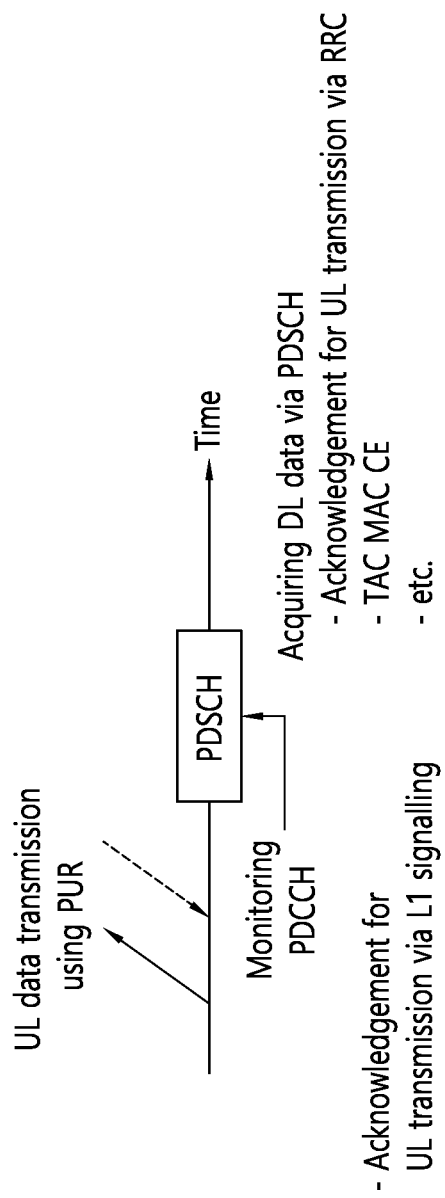
FIG. 11 shows another example of a general procedure for transmission using PUR.

FIG. 11 shows another example of a general procedure for transmission using PUR.

(1) The UE transmits UL data using PUR in RRC_IDLE and/or RRC_INACTIVE.
(2) The UE monitors PDCCH. The PDCCH may carry scheduling information for PDSCH. The PDCCH may carry acknowledgement for UL data transmission using PUR via L1 signaling.
(3) The UE acquires DL data/information on PDSDH which is scheduled by the scheduling information in PDCCH. The DL data/information may include acknowledgement for UL data transmission using PUR via RRC signaling. The DL data/information may further include TAC MAC CE, etc.

In summary, after transmitting UL data using PUR, the UE may determine completion of the UL data transmission based on acknowledgement for UL data transmission using PUR.

The acknowledgement for UL data transmission using PUR may be L1 signaling acknowledgement received via PDCCH. The UE may determine that the UL data transmission using PUR is successful upon receiving the L1 signaling acknowledgement via PDCCH, and the procedure for the UL data transmission using PUR may be considered as completed without monitoring PDSCH.

Alternatively, the acknowledgement for UL data transmission using PUR may be L3 signaling acknowledgement received via PDSCH. The UE may first monitor PDCCH which schedules PDSCH, and may receive the acknowledgement for UL data transmission using PUR via PDSCH. The UE may determine that the UL data transmission using PUR is successful upon receiving the L3 signaling acknowledgement via PDSCH, and the procedure for the UL data transmission using PUR may be considered as completed.

As described above, preconfigured uplink resource (PUR) is designed for NB-IoT and MTC networks in order to save power consumption for data transmission. The UE may transmit UL data in RRC_IDLE and/or RRC_INACTIVE without random access procedure and/or state transition to a connected state (for example, RRC_CONNECTED).

In Preconfigured uplink resource (PUR) procedure, the UE may count "m" not to waste PUR resources. If the UE detects "m" consecutive PUR transmission failures, the UE may request PUR configuration release to the network. The failures may include the case that the UE has not used a PUR resource for data transmission or the case that the UE has not received the acknowledgement from the network. In the latter case, the network may consider the PUR transmission is successful while the UE considers that the transmission is failed.

For "m" consecutive times of the PUR procedure failures, it may not be the best solution to release the PUR configuration. For example, the downlink (DL) quality of the UE is worse than the uplink (UL) quality such that UL data transmission using PUR is successful but the acknowledgement does not reach at the UE. In that case, it might be better to receive PUR reconfiguration to increase coverage level than to release the PUR. For example, the information to indicate why the PUR transmission has failed for consecutive times would be helpful.

Therefore, studies for handling failures in transmission using PUR in a wireless communication system are required.

Hereinafter, a method for handling failures in transmission using PUR in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 12:
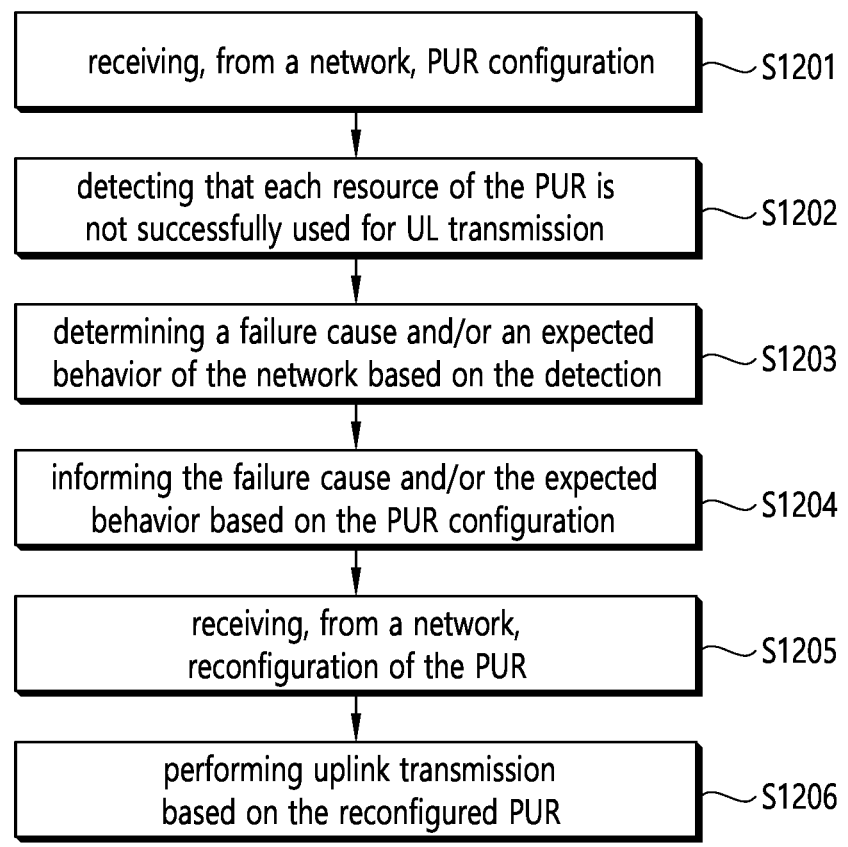
FIG. 12 shows an example of a method for handling failures in transmission using PUR in a wireless communication system, according to some embodiments of the present disclosure.

FIG. 12 shows an example of a method for handling failures in transmission using PUR in a wireless communication system, according to some embodiments of the present disclosure.

In particular, FIG. 12 shows an example of a method performed by a wireless device.

In step S1201, a wireless device may receive, from a network, preconfigured uplink resource (PUR) configuration.

For example, the PUR configuration may include information on failure reporting condition. When the failure reporting condition is met, the wireless may inform a failure cause and/or an expected behavior of the network to the network, in step S1204.

For example, the PUR configuration may include information related to failure of transmission using the preconfigured resources. For example, the PUR configuration may include types of unsuccessful transmission using PUR.

For example, the PUR configuration may include information related to at least one of failure causes and/or information related to at least one of expected behaviors of the network. For example, the PUR configuration may include list of failure causes and/or list of expected behaviors of the network.

For example, the PUR configuration may include information related to a failure reporting counter and a maximum number of the failure reporting counter. For example, the maximum number of the failure reporting counter could be configured by the network or the wireless device.

For example, the wireless device may receive the PUR configuration via at least one of dedicated RRC signaling, L2 signaling (for example, MAC CE), and/or L1 signaling (for example, DCI). For example, the wireless device may receive the PUR configuration in idle state, inactive state, and/or connected state.

In step S1202, a wireless device may detect that each resource of the PUR is not successfully used for UL transmission.

For example, the detecting that each resource of the PUR is not successfully used for UL transmission may include at least one of (1) detecting that the wireless device does not transmit anything using the each resource of the PUR, (2) detecting that the wireless device does not transmit user data using the each resource of the PUR, (3) detecting that the wireless device does not receive an acknowledgement for the UL transmission using the each resource of the PUR, (4) detecting that the wireless device receives a negative acknowledgement for the UL transmission using the each resource of the PUR, and/or (5) detecting that the wireless device cannot decode DL transmission using preconfigured DL resource(s), which is associated with the PUR. For example, the preconfigured DL resource(s) may start at n subframe after the each resource of the PUR.

In step S1203, a wireless device may determine a failure cause and/or an expected behavior of the network based on the detection.

For example, the failure cause may inform that a size of a data for UL transmission is bigger than a maximum size of a data for the each resource of the PUR.

For example, the expected behavior of the network may informs that the network will transmit the reconfiguration of the PUR to the wireless device.

For example, the expected behavior of the network may informs that the network will release the PUR for the wireless device.

For example, the expected behavior of the network may informs that the network will change coverage enhancement for the wireless device.

In step S1204, a wireless device may inform the failure cause and/or the expected behavior based on the PUR configuration.

For example, the wireless device may transmit, to the network, a failure report including the failure cause and/or the expected behavior of the network.

For example, the wireless device may inform the failure cause and/or the expected behavior of the network to the network using resource of the PUR.

In particular, when a size of a UL data is bigger than a size of each PUR resource, the wireless device could not perform the UL transmission using the PUR. In this case, the wireless device could transmit, to the network, the failure report using the PUR.

According to some embodiments of the present disclosure, a wireless device may configure a failure reporting counter for the PUR. For example a wireless device may configure the failure reporting counter based on the received PUR configuration in step S1201.

A wireless device may increase the failure reporting counter upon the each detection for the unsuccessfully used resource of the PUR. For example, when the wireless device detects that each resource of the PUR is not successfully used for uplink (UL) transmission, the wireless device may increase the failure reporting counter.

A wireless device may inform the failure cause and/or the expected behavior to the network, based on that the failure reporting counter reaches a maximum number of the failure reporting counter.

For example, a wireless device may initialize the failure reporting counter upon informing the failure cause and/or the expected behavior to the network.

For example, a wireless device may initialize the failure reporting counter upon performing UL transmission using the PUR successfully.

In step S1205, a wireless device may receive, from a network, reconfiguration of the PUR.

For example, the reconfiguration of the PUR may include a delta configuration of the PUR configuration.

For example, the delta configuration may include difference of the resource of the PUR from the PUR configuration received in step S1201.

For example, the reconfiguration of the PUR may include information related to at least one resource of which the size is bigger than or equal to the size of the data for UL transmission.

For example, a wireless device may configure the bigger resource than the originally configured resource for transmission using PUR based on the reconfiguration of the PUR.

In step S1206, a wireless device may performing UL transmission based on the reconfigured PUR.

For example, a wireless device may transmit, to the network by using the reconfigured PUR, the UL data of which the size is bigger than the resource of the originally configured PUR.

According to some embodiments of the present disclosure, the wireless device is in communication with at least one of a user equipment, a network, or an autonomous vehicle other than the wireless device.

Figure 13:
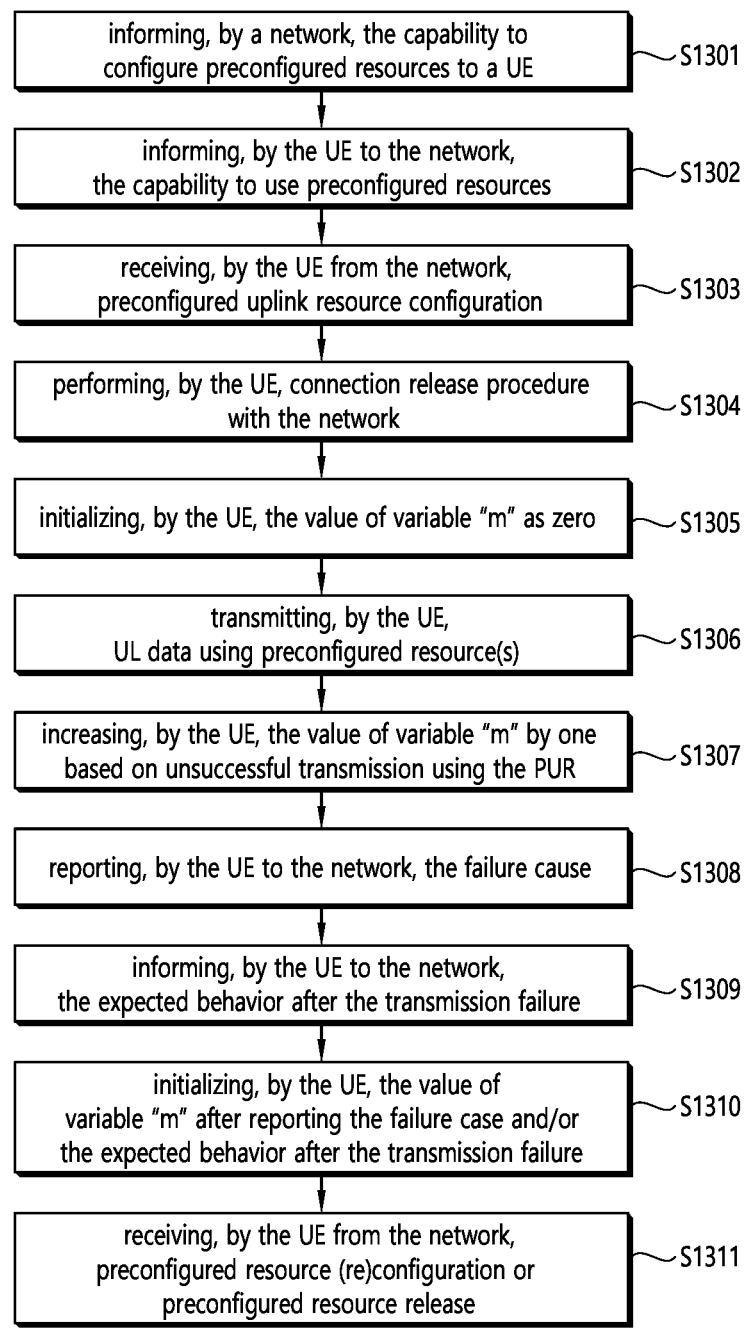
FIG. 13 shows an example of a method for performing the PUR transmission failure procedure in RRC_IDLE or RRC_INACTIVE in a wireless communication system, according to some embodiments of the present disclosure.

FIG. 13 shows an example of a method for performing the PUR transmission failure procedure in RRC_IDLE or RRC_INACTIVE in a wireless communication system, according to some embodiments of the present disclosure.

In particular, in FIG. 13, the UE may inform the failure cause(s) of PUR procedure or the expected behavior (for example, reconfiguration, coverage enhancement change, releasing) to a network. Based on the UE report, the network may reconfigure the PUR to the UE. Therefore, the UE could continue data transmission using PUR.

In step S1301, the network (for example, abase station (BS)) may inform the capability to configure preconfigured resources to the UE.

For example, the network (for example, the BS) may broadcast the capability.

For example, the network (for example, the BS) may inform the capability via NAS signalling during Attach or Location registration procedures.

For example, the network (for example, the BS) may inform the capability via RRC signalling during the RAN area update procedure or during PUR configuration procedure.

In step S1302, the UE may inform, to the network, the capability to use preconfigured resources.

For example, the UE may inform the capability to the network via NAS signalling.

For example, the UE may inform the capability to the network via dedicated RRC signalling.

In step S1303, the UE may receive preconfigured uplink resource configuration from the network.

For example, the network (for example, the BS) may configure preconfigured resources via at least one of dedicated RRC signaling, L2 signaling (for example, MAC CE), and/or L1 signaling (for example, DCI) in RRC_CONNECTED, RRC_IDLE, and/or RRC_INACTIVE.

For example, the network (for example, the BS) may configure information related to DL transmission associated with UL transmission using preconfigured resources. The DL transmission may include the response for UL data transmission using preconfigured resources. The response may include at least one of L1, L2, L3, and/or Application layer acknowledgement.

For example, the network (for example, the BS) may inform the maximum value of variable "m" via broadcast and/or dedicated RRC signalling.

For example, the network (for example, the BS) may indicate information related to failure of transmission using the preconfigured resources. For example, the network (for example, the BS) may indicate what kind of failure information and/or when the UE informs to the network. (i.e., combined failure causes, one important failure cause, the last failure cause, report if the value of "m" reaches the maximum, etc.)

In step S1304, the UE may perform connection release procedure with the network (for example, the BS). The UE may receive RRC release message from the network (for example, the BS). Upon receiving the RRC release message, the UE may enter RRC_IDLE and/or RRC_INACTIVE.

In step S1305, the UE may initialize the value of variable "m" as zero.

For example, the UE may set the value of "m" to zero when the UE applies PUR configuration.

For example, the UE may set the value of "m" to zero whenever the PUR transmission is successful.

In step S1306, the UE may transmit UL data using preconfigured resource(s).

For example, the UE may start a timer when the UE transmits UL data. The UE RRC or MAC may maintain the timer. Upon expiry of the timer without acquiring any DL information, the UE may consider the UL transmission has failed.

For example, the UE may monitor DL resource(s) that is assigned for a response of the UL transmission using preconfigured resource(s).

In step S1307, the UE may increase the value of variable "m" by one. The UE may increase the value of variable "m" by one based on unsuccessful transmission using the PUR.

For example, the UE may increase the value of "m" by one if the UE does not transmit anything using preconfigured resource(s).

For example, the UE may increase the value of "m" by one if the UE does not transmit user data using preconfigured resource(s).

For example, the UE may increase the value of "m" by one if the UE does not receive an acknowledgement of the UL transmission using preconfigured resource(s).

For example, the UE may increase the value of "m" by one if the UE receives a negative acknowledgement of the UE transmission using preconfigured resource(s).

For example, the UE may increase the value of "m" by one if the UE cannot decode DL transmission using the preconfigured or preassigned DL resource(s), which is associated with preconfigured UL resources (for example, starting at n subframe after UL transmission).

In step S1308, the UE may report the failure cause to the network (for example, the BS). The UE may inform the network (for example, the BS) of the reason why the value of "m" has been increased.

For example, the UE may send the failure cause when the value of "m" reaches the maximum.

For example, the UE may send the failure cause if UL transmission has failed due to the preconfigured failure cause.

For example, the failure cause may include at least one of one important failure cause, the cause for combined failure reasons, and/or the last failure cause when the value of "m" has been reaches.

In step S1309, the UE may inform the expected behavior after the transmission failure.

For example, the UE may inform the expected behavior (for example, reconfiguration, release, coverage enhancement change, etc.) to the network.

For example, the UE may inform the expected behavior to the network with or without reporting the failure cause in step S1308.

For example, the UE may inform the requested PUR information with a reconfiguration request or release request.

In step S1310, the UE may initialize the value of variable "m" after reporting the failure cause and/or the expected behavior after the transmission failure.

In step S1311, the UE may receive, from the network, preconfigured resource (re)configuration or preconfigured resource release.

Figure 14:
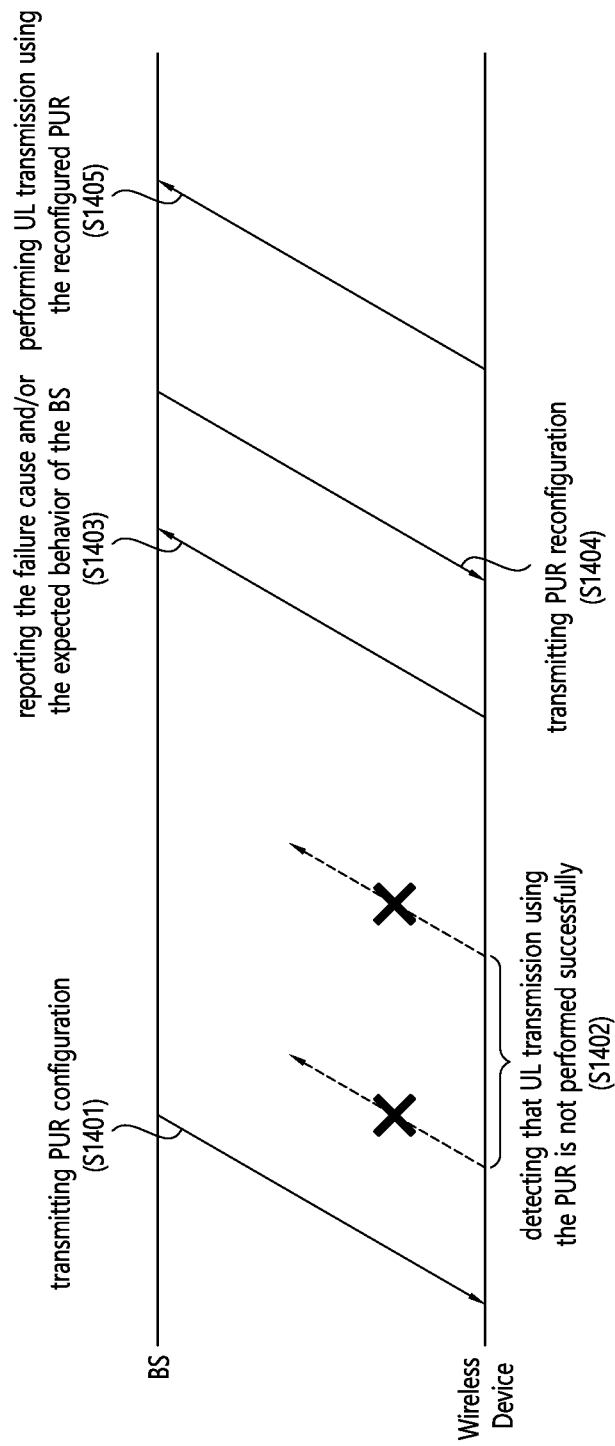
FIG. 14 shows an example of handling failures in transmission using PUR in a wireless communication system, according to some embodiments of the present disclosure.

FIG. 14 shows an example of handling failures in transmission using PUR in a wireless communication system, according to some embodiments of the present disclosure.

In particular, FIG. 14 shows an example of method performed by a base station (BS) and a wireless device.

In step S1401, the BS (for example, a eNB or a gNB), may transmit, to the wireless device (for example, a UE), a preconfigured uplink resource (PUR) configuration.

In step S1402, the wireless device may detect that UL transmission using the PUR may not be performed successfully.

For example, the UL transmission using the PUR may not be performed successfully since the size of the UL data is bigger than the each resource of the PUR.

For example, the wireless device may increase a failure reporting counter upon detecting each failure of the UL transmission using the PUR.

In step S1403, the wireless device may report, to the BS, a failure cause and/or an expected behavior of the BS.

For example, the wireless device may transmit, to the BS, the failure cause and/or the expected behavior of the BS using the PUR. In this case, the failure cause and/or the expected behavior of the BS could be included in the each resource of the PUR. For example, the size of the failure cause and/or the expected behavior of the BS could be smaller than or equal to the each resource of the PUR.

For example, the wireless device may report the failure cause and/or the expected behavior of the BS when the failure reporting counter reaches a maximum number of the failure reporting counter.

For example, the failure cause may inform that the size of the UL data is bigger than the size of the each resource of the PUR. For example, the failure cause may inform the size of the UL data.

For example, the expected behavior of the BS may inform that the BS will transmit a PUR reconfiguration without releasing the current PUR.

In step S1404, the BS may transmit, to the wireless device, a PUR reconfiguration.

For example, the PUR reconfiguration may include a delta configuration of the current PUR.

For example the wireless device may modify the current PUR based on the delta configuration.

For example, the resource of the reconfigured PUR may be bigger than or equal to the size of the uplink data.

In step S1405, the wireless device may perform the UL transmission using the reconfigured PUR.

For example, the wireless device could transmit, to the BS, the UL data using each resource of the reconfigured PUR, since the size of the UL data is smaller than or equal to the each resource of the reconfigured PUR.

Hereinafter, operations for transmission using PUR are described. The following operations could be applied to implementations of the present disclosure.

According to some embodiments of the present disclosure, the following operations could be applied in a D-PUR procedure.

Valid TA may be a requirement in order to initiate D-PUR transmission.

The UE may use the D-PUR resource to send RRCConnectionRequest or RRCConnectionResumeRequest to establish or resume RRC connection.

For the CP solution, the uplink data may be encapsulated as a NAS PDU in an uplink RRC message transmitted in CCCH.

For the UP solution, the uplink data may be transmitted in DTCH.

After the uplink D-PUR transmission, the UE may monitor PDCCH under the control of a timer.

For example, the timer may start after D-PUR transmission.

For example, the timer may restart if a scheduling for D-PUR retransmission is received.

For example, the UE may consider that the D-PUR transmission has failed if the timer expires.

For example, the timer may be stopped when D-PUR procedure ends and/or D-PUR procedure succeeds.

The downlink RRC response message, if needed, for the CP solution may include at least one of the following optional information:
 downlink data encapsulated as a NAS PDU (downlink application layer response or pending data in MME).
 redirection information.
 D-PUR (re-)configuration and release.

The downlink RRC response message for the UP solution may include at least one of the following optional information:
 Resume ID.
 NCC (mandatory)—the downlink RRC response message for the UP solution is always provided.
 redirection information.
 D-PUR (re-)configuration and release.

The MAC CE for TA update can be sent along with the RRC transmission of the downlink RRC response message for the CP solution and UP solution.

After reception of D-PUR transmission, the eNB can move the UE to RRC connection by RRCConnectionSetup message or RRCConnectionResume message.

Fallback after D-PUR transmission is not successful could be up to UE implementation to initiate legacy RA, MO-EDT, and/or wait for next D-PUR occasion.

According to some embodiments of the present disclosure, the following operations could be applied in D-PUR TA validation.

TA validation criterion "Serving cell changes" may be implicitly always enabled, which means that TA is considered invalid when the UE initiates RA procedure in a different cell than where TA was last validated.

Configuration for TA validation criteria may be provided in dedicated RRC signalling.

For example, it should be possible to disable each or all of the optional TA validation criteria (for example, TA timer, (N)RSRP change) via RRC signalling.

UE may keep the PUR configuration while TA is considered invalid, but PUR cannot be used until eNB validates the existing TA/provides a new TA.

Working assumption: Counter for D-PUR occasions, for example, "n", is not introduced and "indefinite" or "one-shot" are the only possible configurations.

A new TA timer may be defined for UEs configured with D-PUR in idle mode.

For example, the (re)starting times for TA timer need to be aligned between UE and eNB.

For example, TA timer is restarted after TA is updated.

For example, the value range for the TA timer is FFS. Value of "infinity" is possible.

According to some embodiments of the present disclosure, the following operations could be applied in D-PUR Request, (re)configuration and release mechanism.

D-PUR request can be sent only by BL UE, UE in CE or NB-IoT UE; and which are capable of D-PUR.

D-PUR request can be sent when the UE is in RRC_CONNECTED.

D-PUR request may include number of PUR grant occasions requested with possibility to request infinite.

UE can request D-PUR release.

A new RRC message may be introduced for transmission of PUR request when UE is in RRC_CONNECTED (for example, not for the cases of sending PUR request during EDT and during PUR).

UE-specific PUR (re)configuration can be provided while UE is in RRC_CONNECTED.

PUR (re)configuration can be included in RRC Connection Release.

At least one of the following information can be included in PUR (re)configurations:
 "m" consecutive missed allocations before release.
 Time Alignment Timer for idle mode.
 RSRP change threshold for Serving cell.

For UP solution, when PUR request is being piggybacked in the PUR transmission, same RRC message used for PUR transmission may be used to include PUR request.

PUR (re)configuration can be provided in DL RRC response message (message FFS) of the D-PUR procedure.

Explicit reject message (NW->UE) in response to PUR request may not be introduced.

Delta configuration may be supported for PUR reconfiguration.

If the UE performs EDT or moves to RRC_CONNECTED and comes back to RRC_IDLE in the same cell, PUR configuration remains valid unless specifically released or reconfigured by network or other triggers.

PUR can be released explicitly by RRCConnectionRelease message and DL RRC response message (FFS message) of the D-PUR procedure.

EDT cannot be initiated solely for the purpose of sending PUR request in EDT Msg3.

UE may not be restricted from initiating RRC Connection for the purpose of sending PUR request.

According to some embodiments of the present disclosure, the following operations could be applied in L1 ACK.

If RRC response message is not needed, eNB may send L1 ACK to acknowledge the PUR transmission in UL. The L1 ACK concludes the PUR procedure and UE moves to Idle.

According to some embodiments of the present disclosure, the following operations could be applied related to the "m" operation for PUR.

UE shall increase 'm' when (1) PUR occasion is not used while UE is in RRC_IDLE and (2) PUR occasion is used in RRC_IDLE but no response (none of HARQ ACK/NACK, L1 ACK or L2/L3 response) is received.

Network shall increase 'm' when no response corresponding to a PUR occasion (none of HARQ ACK/NACK, L1 ACK or L2/L3 response) is sent by the network.

Counter 'm' may be not increased (neither by UE nor eNB) while UE is in RRC_CONNECTED.

Counter 'm' may be reset to zero after successful communication between UE and eNB using PUR.

Counter 'm' may be reset to zero after successful communication between UE (with a valid PUR configuration) and eNB in RRC_CONNECTED.

Access barring methods could be also applicable for PUR.

Counter 'm' may be increased if PUR is skipped due to access barring (for example, if there is no special handling).

Counter 'm' may be increased if PUR is skipped due to UE being in extendedWaitTime (for example, if there is no special handling).

Support synchronizing current value of 'm' when UE (with a valid PUR configuration) is in RRC_CONNECTED for example, using RRC Connection Release message.

Configurable value of m could be one of {2, 3, 4, 8}.

Figure 15:
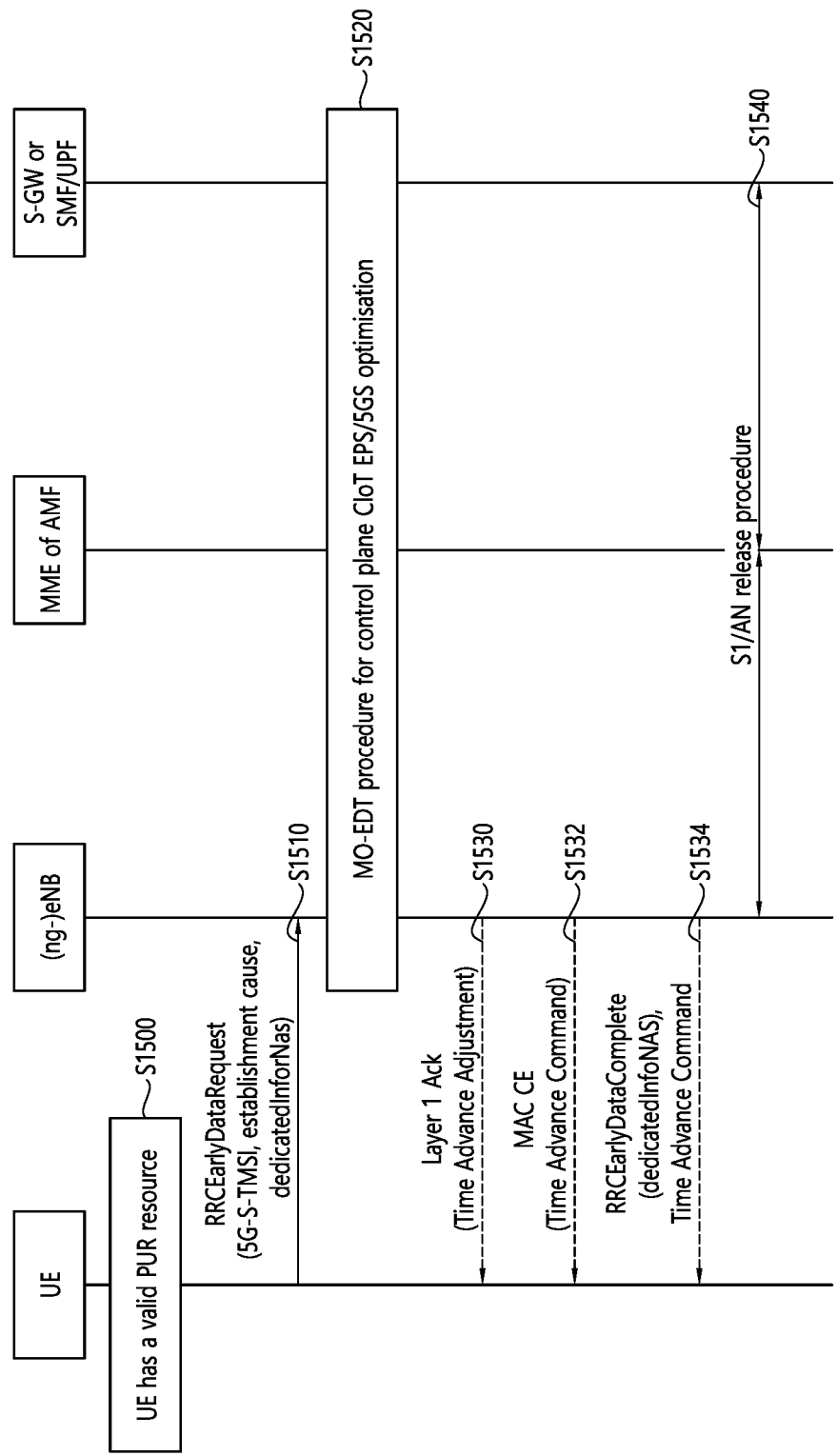
FIG. 15 shows an example of transmission using PUR for the control plane cellular IoT (CIoT) evolved packet system (EPS)/5G system (5GS) optimizations to which implementations of the present disclosure is applied.

FIG. 15 shows an example of transmission using PUR for the control plane cellular IoT (CIoT) evolved packet system (EPS)/5G system (5GS) optimizations to which implementations of the present disclosure is applied.

Transmission using PUR for control plane CIoT EPS optimization, and for control plane CIoT 5GS optimization is characterized as below:
 UL user data are transmitted using the PUR resource in a NAS message concatenated in RRCEarlyDataRequest message on CCCH;
 If there is no downlink data, the (ng-)eNB may terminate the procedure by sending a layer 1 acknowledgement optionally containing a Time Advance Command, a MAC Time advance Command or RRCEarlyDataComplete with no user data;
 DL user data, if any, are transmitted in a NAS message concatenated in RRCEarlyDataComplete message on CCCH;
 There is no transition to RRC CONNECTED.

In step S1500, the UE has determined that the PUR resource can be used (e.g., PUR enabled in the cell, valid time alignment, etc.).

In step S1510, the UE transmits RRCEarlyDataRequest message including UL user data in a NAS message (e.g., dedicatedInfoNas) over the PUR resource.

If the UL data are too large to be included in RRCEarlyDataRequest, the UE can use the PUR resource to transmit RRCConnectionRequest. The procedure will fall back to the legacy RRC connection establishment procedure, a new cell radio network temporary identity (C-RNTI) can be assigned.

After step S1510, the (ng-)eNB may request the UE to abort the transmission using PUR by sending a Layer 1 fallback indication.

In step S1520, the MO-EDT procedure for control plane CIoT EPS/5GS optimizations is performed.

In step S1530, if the (ng-)eNB is aware that there is no pending DL data or signaling, the (ng-)eNB can send a Layer 1 ACK optionally containing a Time Advance Adjustment to the UE to update the TA and terminate the procedure.

In step S1532, if the (ng-)eNB is aware that there is no further data or signaling, the (ng-)eNB can send a Time Advance Command to update the TA and terminate the procedure.

In step S1534, the (ng-)eNB may transmit RRCEarly-DataComplete message which may optionally including DL user data in a NAS message (e.g., dedicatedInfoNAS). A Time Advance Command can also be included.

If the MME/AMF or the (ng-)eNB decides to move the UE to RRC_CONNECTED mode, RRCConnectionSetup message is sent in steps S1530 to S1534 to fall back to the legacy RRC connection establishment procedure, a new C-RNTI can be assigned. The (ng-)eNB will discard the zero-length NAS PDU received in RRCConnectionSetupComplete message.

If none of Layer 1 Acknowledgement, MAC Time advance Command, RRCEarlyDataComplete and, in case of fallback, RRCConnectionSetup is received in response to RRCEarlyDataRequest, the UE considers the UL data transmission not successful.

In step S1540, S1/AN release procedure is performed.

FIG. 16 shows an example of transmission using PUR for the user plane CIoT EPS optimization to which implementations of the present disclosure is applied. FIG. 17 shows an example of transmission using PUR for the user plane CIoT 5GS optimization to which implementations of the present disclosure is applied.

Transmission using PUR for user plane CIoT EPS optimization, and for user plane CIoT 5GS optimization are characterized as below:

- The UE is in RRC_IDLE and has a valid PUR resource;
- The UE has been provided with a NextHopChaining-Count in the RRCConnectionRelease message with suspend indication;
- UL user data are transmitted on DTCH multiplexed with RRCConnectionResumeRequest message on CCCH;
- DL user data are optionally transmitted on DTCH multiplexed with RRCConnectionRelease message on DCCH;
- The user data in UL and DL are ciphered. The keys are derived using the NextHopChainingCount provided in the RRCConnectionRelease message of the previous RRC connection;
- The RRCConnectionRelease message is integrity protected and ciphered using the newly derived keys;
- There is no transition to RRC CONNECTED.

In steps S1600/S1700, the UE has validated the PUR resource according to the configured criteria.

In steps S1610/S1710, the UE transmits RRCConnectionResumeRequest message together with UL user data over the PUR resource.

If the user data are too large to be fully included in the transmission using PUR, the UE can use PUR to transmit RRCConnectionResumeRequest and a segment of the user data. The procedure will fall back to the legacy RRC Connection Resume procedure, and a new C-RNTI can be assigned.

After steps S1610/S1710, the (ng-)eNB may request the UE to abort the transmission using PUR by sending a Layer 1 fallback indication.

In steps S1620/S1720, MO-EDT procedure for user plane CIoT EPS/5GS optimizations is performed.

In step S1630/S1730, the (ng-)eNB may transmit RRCConnectionRelease message optionally together with DL user data. A Time Advance Command can also be included.

If the MME/AMF or the (ng-)eNB decides to move the UE to RRC_CONNECTED mode, RRCConnectionResume message is sent in steps S1630/S1730 to fall back to the RRC connection resume procedure. In that case, the RRCConnectionResume message is integrity protected and ciphered with the keys derived in steps S1600/S1700 and the UE ignores the NextHopChainingCount included in the RRCConnectionResume message. A new C-RNTI can be assigned. DL data can be transmitted on DTCH multiplexed with the RRCConnectionResume message. In addition, an RRCConnectionSetup can also be sent in steps S1630/S1730 to fall back to the RRC connection establishment procedure.

Hereinafter, an apparatus for handling failures in transmission using PUR in a wireless communication system, according to some embodiments of the present disclosure, will be described. Herein, the apparatus may be a wireless device (100 or 200) in FIGS. 2, 3, and 5.

For example, a wireless device may perform methods described in FIGS. 12 to 17. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to control the transceiver 106 to receive, from a network, preconfigured uplink resource (PUR) configuration. The processor 102 may be configured to detect that each resource of the PUR is not successfully used for uplink (UL) transmission. The processor 102 may be configured to determine a failure cause and/or an expected behavior of the network based on the detection. The processor 102 may be configured to inform the failure cause and/or the expected behavior based on the PUR configuration. The processor 102 may be configured to control the transceiver 106 to receive, from a network, reconfiguration of the PUR. The processor 102 may be configured to perform UL transmission based on the reconfigured PUR.

According to some embodiments of the present disclosure, the processor 102 may be configured to configure a failure reporting counter for the PUR. The processor 102 may be configured to increase the failure reporting counter upon the each detection for the unsuccessfully used resource of the PUR.

For example, the processor 102 may be configured to inform the failure cause and/or the expected behavior to the network, based on that the failure reporting counter reaches a maximum number of the failure reporting counter.

For example, the processor 102 may be configured to initialize the failure reporting counter upon informing the failure cause and/or the expected behavior to the network.

For example, the processor 102 may be configured to initialize the failure reporting counter upon performing UL transmission using the PUR successfully.

According to some embodiments of the present disclosure, the PUR configuration may include information on failure reporting condition.

According to some embodiments of the present disclosure, the reconfiguration of the PUR may include a delta configuration of the PUR configuration.

According to some embodiments of the present disclosure, the failure cause may inform that a size of a data for UL transmission is bigger than a maximum size of a data for the each resource of the PUR.

For example, the reconfiguration of the PUR may include information related to at least one resource of which the size is bigger than or equal to the size of the data for UL transmission.

According to some embodiments of the present disclosure, the expected behavior of the network may inform that the network will transmit the reconfiguration of the PUR to the wireless device.

According to some embodiments of the present disclosure, the detecting that each resource of the PUR is not successfully used for UL transmission includes at least one of (1) detecting that the wireless device does not transmit anything using the each resource of the PUR, (2) detecting that the wireless device does not transmit user data using the each resource of the PUR, (3) detecting that the wireless device does not receive an acknowledgement for the UL transmission using the each resource of the PUR, (4) detecting that the wireless device receives a negative acknowledgement for the UL transmission using the each resource of the PUR, and/or (5) detecting that the wireless device cannot decode DL transmission using preconfigured DL resource(s), which is associated with the PUR.

For example, the preconfigured DL resource(s) may start at n subframe after the each resource of the PUR.

According to some embodiments of the present disclosure, the wireless device may be in communication with at least one of a user equipment, a network, or an autonomous vehicle other than the wireless device.

Hereinafter, a processor for a wireless device for handling failures in transmission using PUR in a wireless communication system, according to some embodiments of the present disclosure, will be described.

The processor may be configured to control the wireless device to receive, from a network, preconfigured uplink resource (PUR) configuration. The processor may be configured to control the wireless device to detect that each resource of the PUR is not successfully used for uplink (UL) transmission. The processor may be configured to control the wireless device to determine a failure cause and/or an expected behavior of the network based on the detection. The processor may be configured to control the wireless device to inform the failure cause and/or the expected behavior based on the PUR configuration. The processor may be configured to control the wireless device to receive, from a network, reconfiguration of the PUR. The processor may be configured to control the wireless device to perform UL transmission based on the reconfigured PUR.

According to some embodiments of the present disclosure, the processor may be configured to control the wireless device to configure a failure reporting counter for the PUR. The processor may be configured to control the wireless device to increase the failure reporting counter upon the each detection for the unsuccessfully used resource of the PUR.

For example, the processor may be configured to control the wireless device to inform the failure cause and/or the expected behavior to the network, based on that the failure reporting counter reaches a maximum number of the failure reporting counter.

For example, the processor may be configured to control the wireless device to initialize the failure reporting counter upon informing the failure cause and/or the expected behavior to the network.

For example, the processor may be configured to control the wireless device to initialize the failure reporting counter upon performing UL transmission using the PUR successfully.

According to some embodiments of the present disclosure, the PUR configuration may include information on failure reporting condition.

According to some embodiments of the present disclosure, the reconfiguration of the PUR may include a delta configuration of the PUR configuration.

According to some embodiments of the present disclosure, the failure cause may inform that a size of a data for UL transmission is bigger than a maximum size of a data for the each resource of the PUR.

For example, the reconfiguration of the PUR may include information related to at least one resource of which the size is bigger than or equal to the size of the data for UL transmission.

According to some embodiments of the present disclosure, the expected behavior of the network may inform that the network will transmit the reconfiguration of the PUR to the wireless device.

According to some embodiments of the present disclosure, the detecting that each resource of the PUR is not successfully used for UL transmission includes at least one of (1) detecting that the wireless device does not transmit anything using the each resource of the PUR, (2) detecting that the wireless device does not transmit user data using the each resource of the PUR, (3) detecting that the wireless device does not receive an acknowledgement for the UL transmission using the each resource of the PUR, (4) detecting that the wireless device receives a negative acknowledgement for the UL transmission using the each resource of the PUR, and/or (5) detecting that the wireless device cannot decode DL transmission using preconfigured DL resource (s), which is associated with the PUR.

For example, the preconfigured DL resource(s) may start at n subframe after the each resource of the PUR.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for handling failures in transmission using PUR in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to receive, from a network, preconfigured uplink resource (PUR) configuration. The stored a plurality of instructions may cause the wireless device to detect that each resource of the PUR is not successfully used for uplink (UL) transmission. The stored a plurality of instructions may cause the wireless device to determine a failure cause and/or an expected behavior of the network based on the detection. The stored a plurality of instructions may cause the wireless device to inform the failure cause and/or the expected behavior based on the PUR configuration. The stored a plurality of instructions may cause the wireless device to receive, from a network, reconfiguration of the PUR. The stored a plurality of instructions may cause the wireless device to perform UL transmission based on the reconfigured PUR.

According to some embodiments of the present disclosure, the stored a plurality of instructions may cause the wireless device to configure a failure reporting counter for the PUR. The stored a plurality of instructions may cause the wireless device to increase the failure reporting counter upon the each detection for the unsuccessfully used resource of the PUR.

For example, the stored a plurality of instructions may cause the wireless device to inform the failure cause and/or the expected behavior to the network, based on that the failure reporting counter reaches a maximum number of the failure reporting counter.

For example, the stored a plurality of instructions may cause the wireless device to initialize the failure reporting counter upon informing the failure cause and/or the expected behavior to the network.

For example, the stored a plurality of instructions may cause the wireless device to initialize the failure reporting counter upon performing UL transmission using the PUR successfully.

According to some embodiments of the present disclosure, the PUR configuration may include information on failure reporting condition.

According to some embodiments of the present disclosure, the reconfiguration of the PUR may include a delta configuration of the PUR configuration.

According to some embodiments of the present disclosure, the failure cause may inform that a size of a data for UL transmission is bigger than a maximum size of a data for the each resource of the PUR.

For example, the reconfiguration of the PUR may include information related to at least one resource of which the size is bigger than or equal to the size of the data for UL transmission.

According to some embodiments of the present disclosure, the expected behavior of the network may inform that the network will transmit the reconfiguration of the PUR to the wireless device.

According to some embodiments of the present disclosure, the detecting that each resource of the PUR is not successfully used for UL transmission includes at least one of (1) detecting that the wireless device does not transmit anything using the each resource of the PUR, (2) detecting that the wireless device does not transmit user data using the each resource of the PUR, (3) detecting that the wireless device does not receive an acknowledgement for the UL transmission using the each resource of the PUR, (4) detecting that the wireless device receives a negative acknowledgement for the UL transmission using the each resource of the PUR, and/or (5) detecting that the wireless device cannot decode DL transmission using preconfigured DL resource(s), which is associated with the PUR.

For example, the preconfigured DL resource(s) may start at n subframe after the each resource of the PUR.

According to some embodiments of the present disclosure, the stored a plurality of instructions may cause the wireless device to be in communication with at least one of a user equipment, a network, or an autonomous vehicle other than the wireless device.

Hereinafter, a method for handling failures in transmission using PUR performed by a base station (BS) in a wireless communication system, according to some embodiments of the present disclosure, will be described.

The BS may transmit, to a wireless device, preconfigured uplink resource (PUR) configuration. The BS may receive, from the wireless device, a failure cause and/or an expected behavior of the network based on that at least one resource of the PUR is not successfully used for uplink (UL) transmission. The BS may transmit, to the wireless device, reconfiguration of the PUR in response to the received failure cause and/or the expected behavior of the network. The BS may receive, from the wireless device, UL transmission based on the reconfigured PUR.

Hereinafter, a base station (BS) for handling failures in transmission using PUR in a wireless communication system, according to some embodiments of the present disclosure, will be described.

The BS may include a transceiver, a memory, and a processor operatively coupled to the transceiver and the memory.

The processor may be configured to control the transceiver to transmit, to a wireless device, preconfigured uplink resource (PUR) configuration. The processor may be configured to control the transceiver to receive, from the wireless device, a failure cause and/or an expected behavior of the network based on that at least one resource of the PUR is not successfully used for uplink (UL) transmission. The processor may be configured to control the transceiver to transmit, to the wireless device, reconfiguration of the PUR in response to the received failure cause and/or the expected behavior of the network. The processor may be configured to control the transceiver to receive, from the wireless device, UL transmission based on the reconfigured PUR.

The present disclosure can have various advantageous effects.

According to some embodiments of the present disclosure, a wireless device could handle failures in transmission using PUR efficiently.

For example, a wireless device may not release preconfigured resource by reporting at least one of the failure cause, the failure reason, and/or the expected behavior.

For example, a wireless device could avoid the signalling by receiving resource reconfiguration rather than receiving resource configuration after release.

For example, a wireless device could save the resource by receiving resource reconfiguration without releasing the PUR.

According to some embodiments of the present disclosure, a wireless communication system could handle failures in transmission using PUR efficiently.

For example, a wireless communication system could save the resource by providing resource reconfiguration to a wireless device without releasing the PUR.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising,
   receiving, from a network, preconfigured uplink resource configuration;
   configuring a failure reporting counter for the preconfigured uplink resource;
   detecting that each resource of the preconfigured uplink resource is not successfully used for uplink transmission;
   determining a failure cause and/or an expected behavior of the network based on the detection;
   increasing the failure reporting counter upon each detection of an unsuccessfully used resource of the preconfigured uplink resource;
   informing the network of the failure cause and/or the expected behavior based on the preconfigured uplink resource configuration;
   initializing the failure reporting counter upon informing the network of the failure cause and/or the expected behavior;
   receiving, from a network, a reconfiguration of the preconfigured uplink resource; and
   performing uplink transmission based on the reconfigured preconfigured uplink resource.

2. The method of claim 1, wherein the network is informed of the failure cause and/or the expected behavior based on that the failure reporting counter reaches a maximum number of the failure reporting counter.

3. The method of claim 1, wherein the method further comprises,
   initializing the failure reporting counter upon performing uplink transmission using the preconfigured uplink resource successfully.

4. The method of claim 1, wherein the preconfigured uplink resource configuration includes information on a failure reporting condition.

5. The method of claim 1, wherein the reconfiguration of the preconfigured uplink resource includes a delta configuration of the preconfigured uplink resource configuration.

6. The method of claim 1, wherein the failure cause is that a size of data for uplink transmission is bigger than a maximum size of data for each resource of the preconfigured uplink resource.

7. The method of claim 6, wherein the reconfiguration of the preconfigured uplink resource includes information related to at least one resource of which the size is bigger than or equal to the size of the data for uplink transmission.

8. The method of claim 1, wherein the expected behavior of the network is that the network will transmit the reconfiguration of the preconfigured uplink resource to the wireless device.

9. The method of claim 1, wherein the detecting that each resource of the preconfigured uplink resource is not successfully used for uplink transmission includes at least one of:
   (1) detecting that the wireless device does not transmit anything using each resource of the preconfigured uplink resource;
   (2) detecting that the wireless device does not transmit user data using each resource of the preconfigured uplink resource;
   (3) detecting that the wireless device does not receive an acknowledgement for the uplink transmission using each resource of the preconfigured uplink resource,
   (4) detecting that the wireless device receives a negative acknowledgement for the uplink transmission using each resource of the preconfigured uplink resource; and/or
   (5) detecting that the wireless device cannot decode a downlink transmission using a preconfigured downlink resource(s), which is associated with the preconfigured uplink resource.

10. The method of claim 9, wherein the preconfigured downlink resource(s) starts at a subframe n after each resource of the preconfigured uplink resource.

11. The method of claim 1, wherein the wireless device is in communication with at least one of a user equipment, a network, or an autonomous vehicle other than the wireless device.

12. A wireless device in a wireless communication system comprising:
   a transceiver;
   a memory; and
   at least one processor operatively coupled to the transceiver and the memory, and configured to:
   control the transceiver to receive, from a network, preconfigured uplink resource configuration;
   configure a failure reporting counter for the preconfigured uplink resource;
   detect that each resource of the preconfigured uplink resource is not successfully used for uplink transmission;
   determine a failure cause and/or an expected behavior of the network based on the detection;

increase the failure reporting counter upon each detection of an unsuccessfully used resource of the preconfigured uplink resource;

inform the network of the failure cause and/or the expected behavior based on the preconfigured uplink resource configuration;

initialize the failure reporting counter upon informing the network of the failure cause and/or the expected behavior;

control the transceiver to receive, from a network, a reconfiguration of the preconfigured uplink resource; and perform uplink transmission based on the reconfigured preconfigured uplink resource.

13. The wireless device of claim 12, wherein the network is informed of the failure cause and/or the expected behavior based on that the failure reporting counter reaches a maximum number of the failure reporting counter.

14. The wireless device of claim 12, wherein the at least one processor is further configured to, initialize the failure reporting counter upon performing uplink transmission using the preconfigured uplink resource successfully.

15. The wireless device of claim 12, wherein the preconfigured uplink resource configuration includes information on a failure reporting condition.

16. A non-transitory computer-readable medium having stored thereon a plurality of instructions, which, when executed by a processor of a wireless device, cause the wireless device to:

receive, from a network, preconfigured uplink resource configuration;

configure a failure reporting counter for the preconfigured uplink resource;

detect that each resource of the preconfigured uplink resource is not successfully used for uplink transmission;

determine a failure cause and/or an expected behavior of the network based on the detection;

increase the failure reporting counter upon each detection of an unsuccessfully used resource of the preconfigured uplink resource;

inform the network of the failure cause and/or the expected behavior based on the preconfigured uplink resource configuration;

initialize the failure reporting counter upon informing the network of the failure cause and/or the expected behavior;

receive, from a network, a reconfiguration of the preconfigured uplink resource; and perform uplink transmission based on the reconfigured preconfigured uplink resource.

* * * * *